(12) United States Patent
Farrell et al.

(10) Patent No.: US 7,622,039 B2
(45) Date of Patent: *Nov. 24, 2009

(54) POURER WITH MAGNETIC ENHANCEMENT

(75) Inventors: Patrick L. Farrell, Huntington Beach, CA (US); H. McMillan Lindsey, Westminster, CA (US); Thomas A. Thompson, Long Beach, CA (US)

(73) Assignee: Inventive Technologies, Inc., Westminster, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/407,613

(22) Filed: Apr. 20, 2006

(65) Prior Publication Data

US 2006/0188617 A1  Aug. 24, 2006

Related U.S. Application Data

(63) Continuation-in-part of application No. 10/893,204, filed on Jul. 16, 2004, now Pat. No. 7,300,580.

(51) Int. Cl.
*C02F 1/48* (2006.01)
*C12H 1/00* (2006.01)

(52) U.S. Cl. ............... 210/222; 210/695; 220/230; 99/275; 99/277.1

(58) Field of Classification Search .............. 210/222, 210/695; 220/230; 99/275, 277.1
See application file for complete search history.

(56) References Cited

U.S. PATENT DOCUMENTS 7,100,495 B2 * 9/2006 Lutzker ............... 210/222
7,300,580 B2 * 11/2007 Lindsey et al. ........... 210/222

FOREIGN PATENT DOCUMENTS

KR  2002-0095410 A  * 12/2002

OTHER PUBLICATIONS

Derwant ACC-No: 2003-309376-Translation of the Abstract of KR-2002-0095410, 2003.*

* cited by examiner

*Primary Examiner*—David A Reifsnyder
(74) *Attorney, Agent, or Firm*—Walter A. Hackler

(57) ABSTRACT

A pourer for improving the taste of water includes a base and a tubular member extending longitudinally through the base. A spout extends outwardly from the tubular member and at least two magnets disposed longitudinally along the tubular member are provided for exposing the water to a magnetic field as the water passes through the tubular member and spout.

7 Claims, 1 Drawing Sheet

POURER WITH MAGNETIC ENHANCEMENT

The present application is a continuation-in-part of U.S. application Ser. No. 10/893,204 filed Jul. 16, 2004, now U.S. Pat. No. 7,300,580.

The present invention generally relates to apparatus and methods for improving the organoleptic properties of beverages including bottled and tap water and is more particularly directed to apparatus and method for exposing beverages and potable water to a magnetic field. With regard to alcoholic beverages, the present invention reduces the perception of tannins and acid. Such alcoholic beverages include wine, brandies, sherries, ports, cognac, spirits, beer, and any other alcoholic beverage. With regard to potable water, the perception of chlorine is reduced and the water tastes better.

Hereinbefore developed devices do not provide a convenient means for an end user to conveniently and selectively magnetically treat water.

The present invention provides for a pourer for enabling selective magnetic treatment of beverages including potable water which is convenient, simple to use, and does not require extensive equipment or the treatment of whole bottles of beverage, or water, or tap water. The pourer in accordance with the present invention is simple in design and the effects are noted immediately as water is exposed to both a magnetic field and to oxygen.

SUMMARY OF THE INVENTION

A pourer in accordance with the present invention for improving organoleptic properties of water generally includes a base and a tubular member extending longitudinally through the base along with a spout extending outwardly from the tubular member.

At least two magnets are disposed longitudinally along the tubular member for exposing the water to a magnetic field as the water passes through the tubular member and spout. It should be appreciated that the magnetic field is concentrated into the water passing through the tubular member because the tubular member may have a lumen therethrough of (for example) ½ inch or less. Accordingly, the volume of water is not of the size requiring either very large magnets.

In one embodiment of the present invention, the pourer includes a stopper extending from the base for insertion into a bottle mouth or water tap and a skirt may be provided and extending from the base for surrounding the stopper and the bottle mouth or tap.

To further enhance or change the organoleptic properties of the water, rapid exposure to oxygen in the air occurs as water is poured. Preferably, an air intake may be provided including an opening disposed transverse to the tubular member for enabling air to be drawn into the water as it passed through the tubular member. Thus, the water may be simultaneously treated with a magnetic field and aerated.

Any number of magnets may be utilized, however, such magnets should be disposed for enhancing the magnetic field therebetween. Accordingly, two magnets may be disposed 180° degrees from one another around the tubular member.

It follows that a method for improving the organoleptic properties of water in accordance with the present invention generally include inserting a pourer as hereinabove described into the bottle or tap and exposing the water to the magnetic field as the water is dispensed from the bottle or tap.

BRIEF DESCRIPTION OF THE DRAWINGS

The advantages and features of the present invention will be better understood by the following description when considered in conjunction with the accompanying drawings in which.

DETAILED DESCRIPTION

Figure 1:
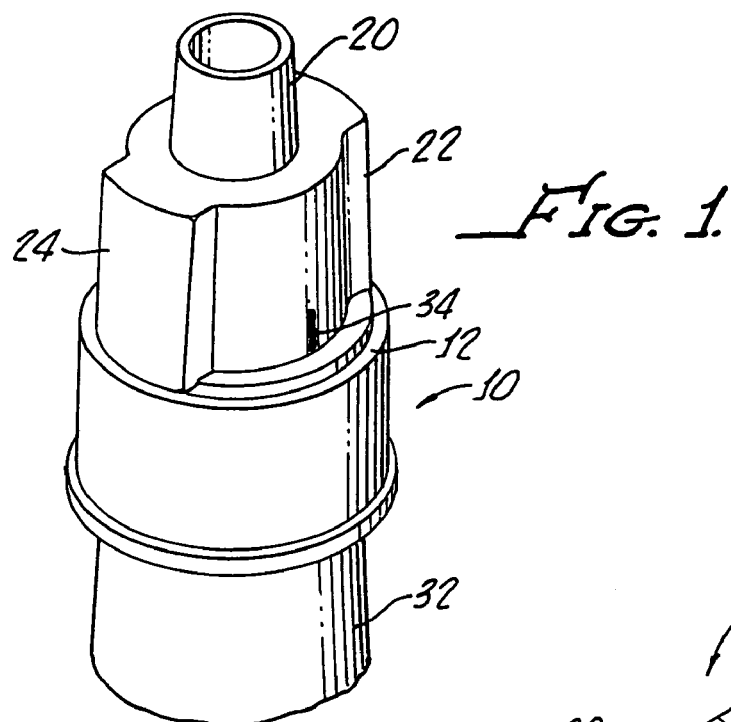
FIG. 1 is a perspective view of the present invention generally including a pourer and showing a base, spout, skirt, and magnets for exposing water to a magnetic field.
Figure 2:
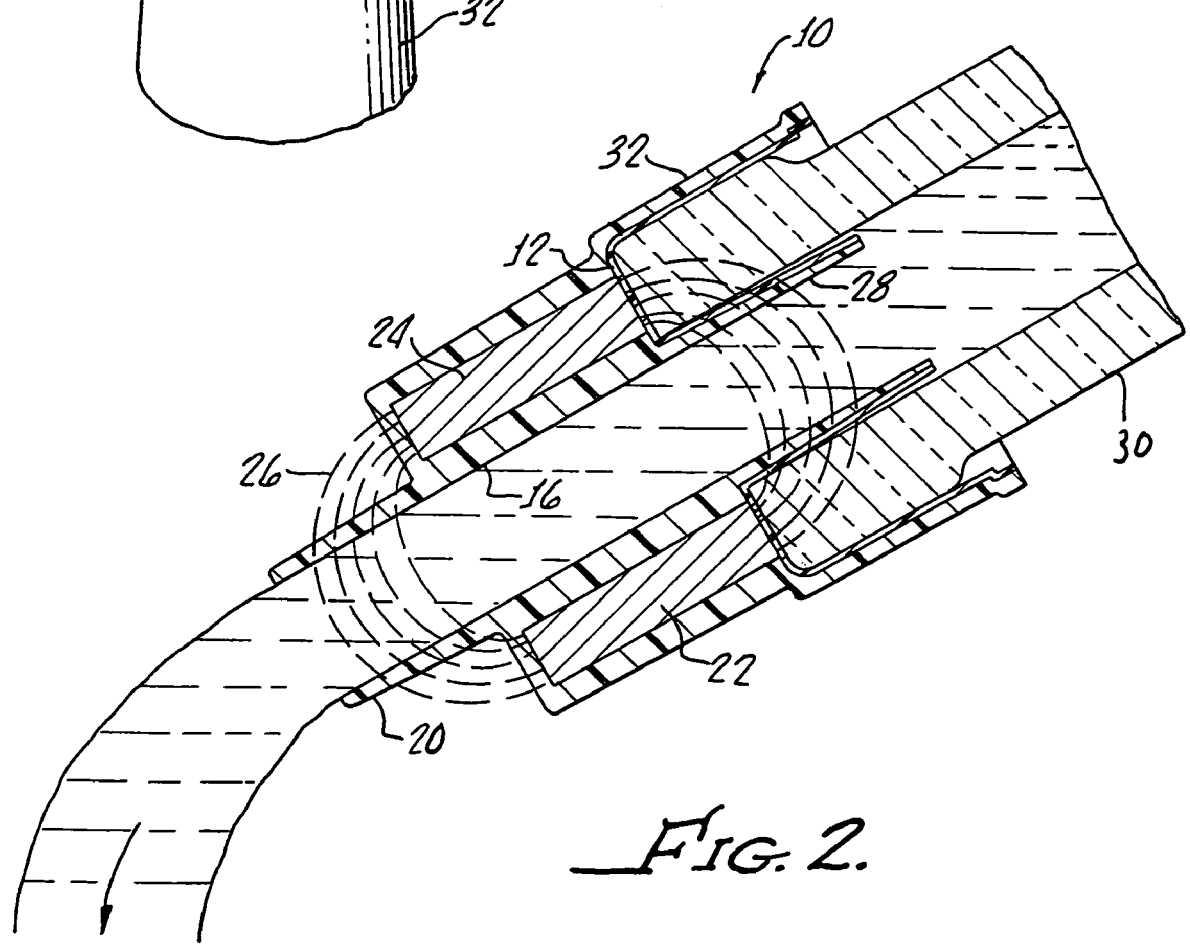
FIG. 2 is a cross sectional view of the pourer shown in FIG. 1 illustrating the pouring of water through the pourer and exposure to a magnetic field.

With reference to FIGS. 1-2, there is shown a pourer 10 in accordance with the present invention for improving the taste of water. As is best shown in FIG. 2 the pourer 10 includes a base 12 along with a tubular member 16 extending longitudinally through the base 12. A spout 20 extends outwardly from the tubular member 16 and at least two permanent magnets 22, 24 are disposed longitudinally along the tubular member 16 for exposing water to a magnetic field as the water passes through the tubular member 16 and spout 20 the magnetic field being represented by lines 26. The longitudinal placement enhances the efficiency of coupling the magnetic field with the beverage passing through the tubular member 16. The permanent magnets 22, 24 may be of any suitable type formed from, for example, iron, steel, or rare earth, such as neodymium, atrontium, and alnico, etc.

More particularly, the pourer 10 includes a stopper 28 extending from the base 12 for insertion into a bottle mouth, or tap, 30. The stopper 28 is sized and tapered for sealably engaging the bottle mouth, or tap, 30. In addition, a skirt 32 may be provided for surrounding the stopper 28 and the bottle mouth, or tap, 30 to prevent the entry of any contamination into the bottle mouth, or tap, 30.

The pourer 10 design enables rapid exposure to oxygen upon pouring by way of, an air intake opening 34 which may extend transversely to the tubular member 16 for enabling air to be drawn into the water as it is passed through the tubular member 16.

As shown, preferably the magnets 22, 24 are disposed 180° degrees from one another or on the tubular member and preferably abut a top portion 38 of the skirt 32 in order that the water is immediately exposed to the magnetic field upon entry into the tabular member 16.

Preferably, the base 12, stopper 28, tubular member 16, and spout 20 are integrally formed with the magnets 22, 24 embedded therein. Any suitable plastic may be used for this purpose.

The pourer 10 includes a relatively small aperture in the tubular member 16 (to ensure a strong magnetic field), flanked by two strong magnets 22, 24, and is affixed to the opening of a bottle, flask, or water tap. The water, as it passes the strong magnetic field, causes an alteration in the configuration of the charged particles that impart taste in water. Particularly, the taste of chlorine is reduced. With immediate exposure to air, chemical changes occur to the structure and configuration of chemicals so as to make the water taste softer. Thus, the water is perceived to taste smoother.

Although there has been hereinabove described a specific pourer with magnetic and aeration enhancement in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A pourer for improving organoleptic properties of water, the pourer comprising:
   a base;
   a tubular member extending longitudinally through said base;
   a spout extending outwardly from said tubular member;
   at least two magnets disposed longitudinally along said tubular member for exposing water to a magnetic field as the water passes through said tubular member and spout; and
   an air intake opening for enabling air to be drawn into the water as it is decanted through said tubular member.

2. The pourer according to claim 1 further comprises a stopper extending from said base for insertion into a water tap.

3. The pourer according to claim 2 further comprising a skirt extending from said base for surrounding said stopper and said water tap.

4. The pourer according to claim 3 wherein the magnets abut a top portion of said skirt.

5. The pourer according to claim 2 wherein time two magnets are disposed 180° degrees from one another around the tubular member.

6. The pourer according to claim 1 wherein the magnets are disposed in a spaced apart relationship with an end of said spout.

7. The pourer according to claim 1 further comprising magnet supports integrally molded with said base, stopper, tubular member, and spout.

* * * * *